Nov. 10, 1953  
C. BOURGONNIER ET AL  
2,659,039  
CAPACITATIVE POTENTIOMETER COMPRISING AT  
LEAST TWO SERIES-CONNECTED CAPACITIES  
Filed May 4, 1946  
2 Sheets-Sheet 1

INVENTORS.
CLAUDE BOURGONNIER
MARC JOUGUET
BY ANDRE BUNODIERE

AGENT.

Nov. 10, 1953  C. BOURGONNIER ET AL  2,659,039
CAPACITATIVE POTENTIOMETER COMPRISING AT
LEAST TWO SERIES-CONNECTED CAPACITIES
Filed May 4, 1946  2 Sheets-Sheet 2

INVENTORS.
CLAUDE BOURGONNIER
BY MARC JOUGUET
ANDRÉ BUNODIERE

AGENT.

Patented Nov. 10, 1953

2,659,039

UNITED STATES PATENT OFFICE 2,659,039

CAPACITATIVE POTENTIOMETER COMPRISING AT LEAST TWO SERIES-CONNECTED CAPACITIES

Claude Bourgonnier, Marc Jouguet, and Andre Bunodiere, Flers, France, assignors, by mesne assignments, to Hartford National Bank and Trust Company, Hartford, Conn., as trustee Application May 4, 1946, Serial No. 667,250

2 Claims. (Cl. 317—249)

This invention relates to a capacitive potentiometer comprising at least two series-connected capacities.

In many sorts of wireless sets use is made of tuned oscillatory circuits constituted by a condenser and by an inductance coil connected in parallel thereto. In this case part of the voltage set up at the oscillatory circuit is frequently supplied to a high impedance, for example the grid-cathode impedance of a discharge tube.

For this purpose the said impedance may be connected to a tapping point and one of the extremities of the inductance coil. This device has the drawback that from the constructive point of view it is not simple to make the variable tapping in such manner that the ratio of division, i. e. the ratio of the output voltage to the input voltage of the potentiometer, is continuously variable. In this respect it is more advantageous to utilize a capacitative potential division, for example by substituting for the condenser of the oscillatory circuit two-series-connected condensers of which at least one is variable, and to connect the said impedance to the terminals of one of the two condensers. In this case the ratio of division may be continuously varied by varying one of the condensers or both of them in the opposite sense. This entails the drawback, however, that the total capacity of the series-connection does not remain constant, which is usually undesirable. In the considered case of an oscillatory circuit, for example, a variation in the ratio of division results in detuning of the oscillatory circuit.

The present invention has for its purpose to constitute by at least two series-connected capacities a capacitative potentiometer in which the last-mentioned drawback does not occur. According to the invention the two capacities may be adjusted by means of a common operating member in such manner that the ratio of division of the series-connection varies continuously, whereas the resulting capacity of the series-connection remains constant.

The constitutive capacities of the potentiometer may preferably be varied by means of a second operating member in such manner that the total capacity of the potentiometer is varied, whereas the ratio of division of the said series-connection either remains constant, or varies in a predetermined manner in accordance with the variation of the total capacity.

In order that the invention may be more clearly understood and readily carried into effect, it will be set out more fully by reference to the accompanying drawings.

Corresponding elements are indicated in the various figures by the same reference numerals.

Figure 1:
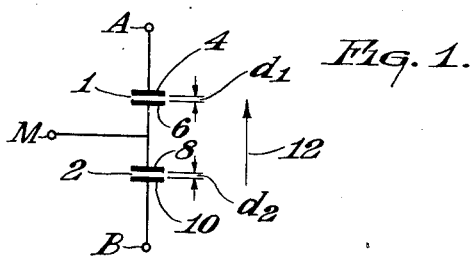
Figs. 1 and 2 show constructional examples of a potentiometer according to the invention.

The constructional example of the potentiometer according to the invention shown in Fig. 1 comprises two series-connected condensers 1 and 2 having electrodes 4, 6 and 8, 10 respectively which may be, for example flat plates which are parallel to each other and of equal size. The electrodes 4 and 10 are connected respectively to input terminals A and B of the potentiometer, the electrodes 6 and 8 being connected in a conductive manner to each other and to a terminal M. The terminal M and one of the terminals A and B constitute the output terminals of the potentiometer.

The distance $d_1$ between the electrodes 4 and 6 and the distance $d_2$ between the electrodes 8 and 10 may be varied by equal values in the opposite sense by means of a common operating member. In this case the sum of the distances $d_1$ and $d_2$ consequently remains constant. It can be easily demonstrated that the resulting capacity of the series-connection of the condensers 1 and 2 is in this case also constant. The capacities $C_1$ and $C_2$ of the condensers 1 and 2 may be represented by the equations $$C_1 = \frac{k}{d_1} \text{ and } C_2 = \frac{k}{d_2}$$

in which $k$ represents a constant. The resulting capacity $C_r$ of the series-connection of the condensers 1 and 2 is $$C_r = \frac{\frac{k}{d_1} \cdot \frac{k}{d_2}}{\frac{k}{d_1} + \frac{k}{d_2}} = \frac{k}{d_1 + d_2}$$

Since $d_1 + d_2$ remains constant, the resulting capacity $C_r$ does not vary when the distances $d_1$ and $d_2$ are varied by the common operating member, whereas the values $C_1$ and $C_2$ vary in the opposite sense, resulting in a variation of the ratio of division of the potentiometer.

The electrodes 4 and 10 are preferably arranged unmovably relatively to each other, the condensers 1 and 2 comprising a common electrode which may be constituted by that the plates 6 and 8, jointly with the rigid connecting piece, constitute one mechanical unit, which may be displaced relatively to the electrodes 4 and 10 in a direction normal to the latter (as indicated by the arrow 12) by means of the common operating member. In this construction the condition $d_1+d_2=$constant is automatically satisfied.

Figure 2:
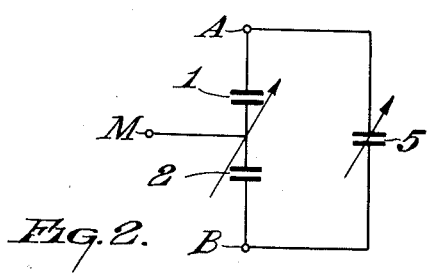

In many cases, for example when the potentiometer according to the invention constitutes the tuning capacity of an oscillatory circuit which must be capable of being tuned to different frequencies, it is desirable that the total capacity of the potentiometer should be variable independently of the ratio of division. As is shown in Fig. 2, for this purpose a variable condenser 5 whose capacity is adjustable by means of a second operating member may be connected in parallel to the series-connected condensers 1 and 2. The total capacity of the potentiometer constituted by the condensers 1, 2 and 5 may then be varied by means of the second operating member independently of the ratio of division.

Figure 3:
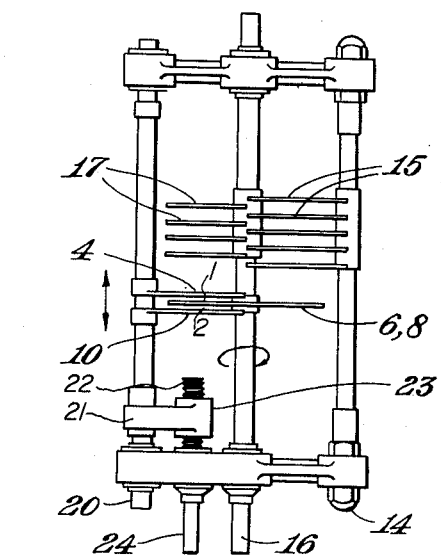
Figs. 3 and 3a show a top and front view, respectively, of one form of potentiometer according to the invention.

A constructive design of this device is shown in Fig. 3. In this case the common electrode of the condensers 1 and 2 is constituted by a circular plate 6, 8 which is mounted on a rotary shaft 16, the two other electrodes 4 and 10, which have also the form of plates, being secured to an insulating rod 20, parallel to the shaft 16, on each side of the plate 6, 8 and in parallel with the latter. The rod 20 is slidable in the axial direction by means of an operating member. The latter is constituted by a control knob (not shown) which is mounted on a rotary shaft 24 comprising a threaded part 22. Over this part is movable a nut 23 which, when the shaft 24 rotates, causes the rod 20 to slide in the axial direction by means of a coupling member 21 mounted on the rod 20. The spacings of the plate 6, 8 on the one hand and of the two plates 4 and 10 on the other hand are thus varied by equal and opposite values.

The shaft 16 has, in addition, mounted on it rotary plates 17 of a variable condenser of a construction known per se, of which the fixed plates 15 are secured to a fixed shaft 14, said condenser corresponding to condenser 5 shown in Fig. 2. Since the plate 6, 8 is of circular shape, the total capacity of the potentiometer may be varied with the aid of a second operating member (not shown) which is secured to the shaft 16, without any variation in the adjustment of the device 4, 10, 6, 8 being involved. The ratio of division consequently remains constant.

Figure 3A:
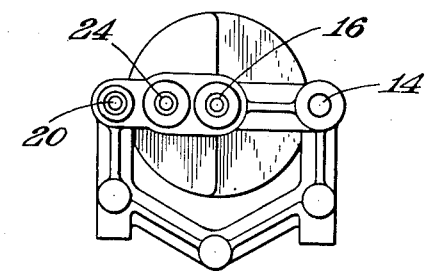
Figure 4:
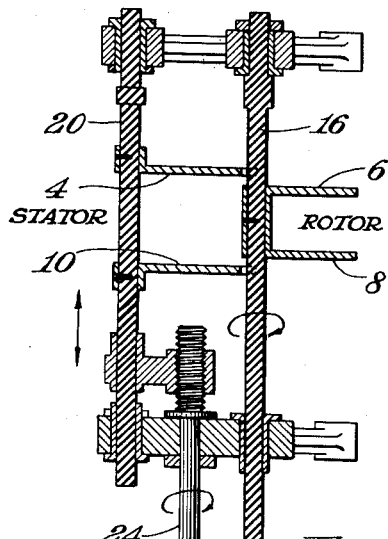
Figs. 4 and 4a show a cross-sectional and front view, respectively, of another form of potentiometer according to the invention.
Figure 4A:
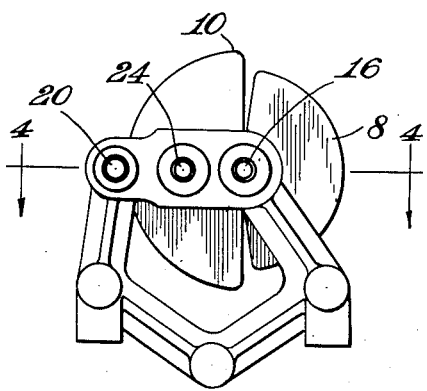

The desired variation of the total capacity of the potentiometer shown in Fig. 1 may also be obtained without parallel connection of a separate condenser. To this end, the potentiometer is so constructed that the active surfaces of the electrodes of the two condensers may be varied simultaneously to the same extent by means of the second operating member. In the construction in which the two electrodes 6 and 8 are mechanically united to form one whole by means of a rigid connection, this variation may be obtained by moving the couple of plates 6, 8 in a direction normal to the arrow 12. Another possibility is illustrated by the Figs. 4 and 4a which correspond in part to Figs. 3 and 3a respectively. In the construction shown in Figs. 4 and 4a, the variation of the active surfaces of the electrodes of the condensers 4, 6 and 8, 10 is obtained by rotating the shaft 16, for which purpose the latter may have provided on it an operating knob (not shown). Like in the potentiometer shown in Fig. 3, the variation of the ratio of division is effected by means of a displacement in the axial direction of the insulating rod 20, on which the electrodes 4 and 10 are secured.

Figure 5:
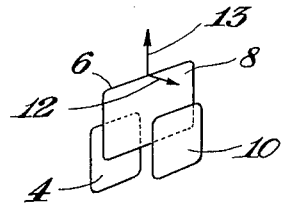
Fig. 5 is a perspective view of still a further form of potentiometer according to the invention.

Fig. 5 is a perspective view of a constructional example of a potentiometer according to the invention, in which the two electrodes 6 and 8 united to form one common electrode are in line with each other. In this case the desired variation of the ratio of division is obtained by moving the common electrode 6, 8 in the direction of the arrow 12, the total capacity of the potentiometer, i. e. the resulting capacity between the electrodes 4 and 10, being varied by displacing the plate 6, 8 in the direction of the arrow 13.

Figure 6:
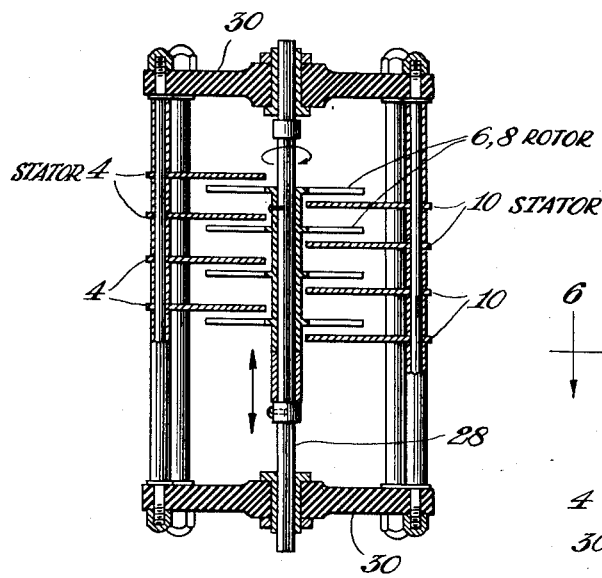
Figs. 6, 6a and 6b show a cross-sectional, front and side-sectional view, respectively, of still another form of potentiometer according to the invention.
Figure 6A:
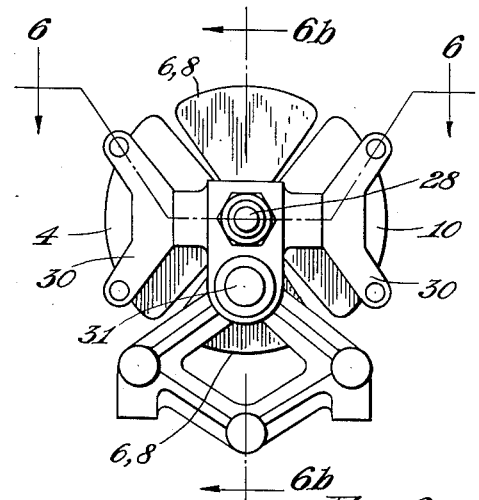
Figure 6B:
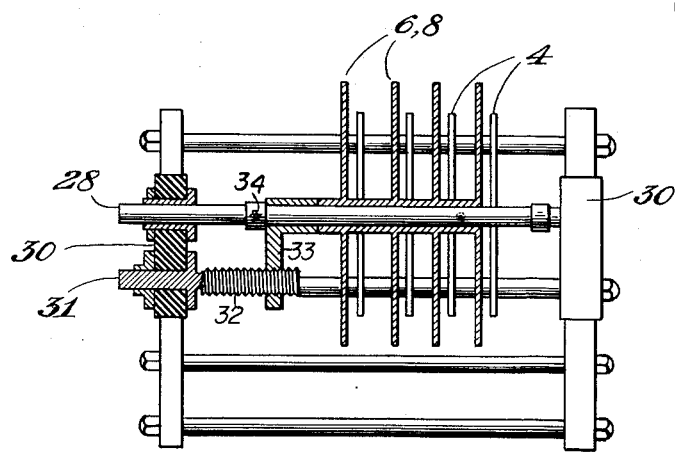

Figs. 6, 6a and 6b represent another constructive design of the potentiometer according to the invention, in which the electrodes 4 and 10 have the shape of sectors of a circle located diametrically opposite and in parallel to each other, the common electrode 6, 8 being constituted by two sectors of a circle relatively connected in a conductive manner and located diametrically opposite to each other, said sectors being rotatable about a shaft 28 through their common centre. Preferably, a number of sets of plates constituted by sectors 4, 6 and 8, 10 are provided which are joined by means of parallel connection to form one potentiometer having a larger maximum capacity. The variation of the ratio of division is obtained by displacing the shaft 28 in the axial direction, which may be effected by means of a device of the kind as the device 21, 22, 23, 24 shown in Fig. 3 in which, however, the shaft 28 must be capable of rotating freely to permit the desired variation of the total capacity. This is obtained by permitting free rotation and displacement of the shaft 28 while providing an additional rotatable shaft 31, below the shaft 28, provided with a threaded part 32 engaging a threaded coupling member 33 which is rotatably linked to the shaft 28. Displacement of the coupling member 33 is prevented by a stop member 34. A change in the overall capacitance is effected by rotation of the shaft 28, on which the rotor blades 6, 8 are fixed, through the coupling member 33, whereas a variation in the ratio of capacitance is obtained by rotation of the shaft 31, which causes a displacement of the shaft 28. The supporting members 30 are insulators to prevent an electrical connection between the capacitors.

We claim:

1. A rotatable capacitative potentiometer comprising two series-connected variable capacitors and comprising two spaced flat parallel substantially sector-shaped electrodes, an insulating member supporting said electrodes in spaced relationship and insulated from each other, a control electrode comprising two flat portions each of which is positioned in capacitative parallel relation to only one of two oppositely oriented faces of each of said spaced electrodes, means for selectively moving said control electrode and said supporting member relative to each other in a direction perpendicular to the said spaced electrodes to thereby continuously vary the ratio of capacity between the said control electrode and the respective spaced electrodes without varying the total series capacitance of the said two spaced electrodes, and means operative upon rotation of said control electrode about an axis perpendicular to the spaced electrodes relative to said spaced electrodes for varying the total capacitance between the spaced electrodes without altering the said ratio of capacitance.

2. A capacitative potentiometer comprising two series-connected variable capacitors and comprising two spaced flat parallel sector-shaped electrodes, an insulating member supporting said electrodes in diametrically opposed axially spaced relationship and insulated from each other, a butterfly-shaped control electrode comprising two flat sector-shaped portions each of which is positioned in capacitative parallel relation to only one of two oppositely oriented faces of each of said spaced electrodes, means for selectively moving said control electrode and said supporting member relative to each other in a direction perpendicular to the said spaced electrodes to thereby continuously vary the ratio of capacity between the said control electrodes and the respective spaced electrodes without varying the total series capacitance of the said two spaced electrodes, and means for rotating said control electrode relative to said spaced electrodes for varying the total capacitance between the spaced electrodes without altering the said ratio of capacitance.

CLAUDE BOURGONNIER.
MARC JOUGUET.
A. BUNODIERE.

References Cited in the file of this patent

UNITED STATES PATENTS

| Number | Name | Date |
|---|---|---|
| 1,616,622 | Horton | Feb. 8, 1927 |
| 1,635,990 | Gargan | July 19, 1927 |
| 1,678,840 | Williams | July 31, 1928 |
| 1,840,298 | Andrewes | Jan. 12, 1932 |
| 1,861,707 | McIver | June 7, 1932 |
| 1,864,882 | Anderson | June 28, 1932 |
| 1,938,334 | Hoffman | Dec. 25, 1933 |
| 1,959,197 | Cohen | May 15, 1934 |
| 1,992,433 | Klotz | Feb. 26, 1935 |
| 2,036,084 | Roder | Mar. 31, 1936 |
| 2,106,336 | Anderson et al. | Jan. 25, 1938 |
| 2,176,451 | Berndt | Oct. 17, 1939 |
| 2,361,657 | Schock | Oct. 31, 1944 |